United States Patent
Mellinger et al.

(10) Patent No.: US 8,549,879 B2
(45) Date of Patent: Oct. 8, 2013

(54) ORNAMENTS FOR EYEGLASSES

(75) Inventors: Wendy Ellen Mellinger, Vienna, VA (US); Tess Audrey Mellinger, Vienna, VA (US)

(73) Assignee: Hot Filament Inc., Vienna, VA (US)

( * ) Notice: Subject to any disclaimer, the term of this patent is extended or adjusted under 35 U.S.C. 154(b) by 0 days.

(21) Appl. No.: 13/462,710

(22) Filed: May 2, 2012

(65) Prior Publication Data

US 2012/0297827 A1 Nov. 29, 2012

Related U.S. Application Data

(60) Provisional application No. 61/489,853, filed on May 25, 2011.

(51) Int. Cl.
*A44C 25/00* (2006.01)
(52) U.S. Cl.
USPC .... 63/23; 351/52; 351/51; 40/596; 40/607.14
(58) Field of Classification Search
None
See application file for complete search history.

(56) References Cited

U.S. PATENT DOCUMENTS

| | | | |
|---|---|---|---|
| D142,935 S | 11/1945 | Barrett et al. | |
| 4,154,513 A | 5/1979 | Goulden | |
| 4,380,101 A | 4/1983 | Joubert et al. | |
| 4,968,128 A | 11/1990 | Mendola | |
| 5,024,515 A | 6/1991 | Beckemeyer et al. | |
| 5,110,198 A | 5/1992 | Travis et al. | |
| 5,469,230 A | 11/1995 | Murai et al. | |
| 5,497,211 A | 3/1996 | McNulty | |
| 5,624,094 A * | 4/1997 | Protz, Jr. | 248/231.81 |
| 5,654,787 A | 8/1997 | Barison | |
| 5,896,184 A | 4/1999 | Lowe et al. | |
| 5,923,395 A | 7/1999 | Yamaguchi et al. | |
| 5,974,632 A | 11/1999 | Chang | |
| 6,098,250 A | 8/2000 | Katz | |
| 6,520,635 B1 | 2/2003 | Ignatowski | |
| 6,863,394 B1 | 3/2005 | Nelson et al. | |
| 6,904,710 B2 | 6/2005 | Lawrence et al. | |
| 7,422,324 B2 | 9/2008 | Lee | |
| 7,524,052 B2 | 4/2009 | Esses | |
| 7,591,554 B2 | 9/2009 | Guerrero | |
| 7,874,669 B2 | 1/2011 | Moritz et al. | |
| D634,775 S | 3/2011 | Cornell | |
| 2002/0170147 A1 | 11/2002 | Heller | |
| 2007/0186455 A1 * | 8/2007 | Lin | 40/640 |
| 2008/0273162 A1 | 11/2008 | Porter | |
| 2009/0273754 A1 * | 11/2009 | Ridgeway | 351/52 |
| 2011/0279769 A1 | 11/2011 | Rhee | |

OTHER PUBLICATIONS

PRWeb, "Ficklets Interchangeable Eyewear Charms Find International Appeal and Charm". PRWeb, Online Article available at www.prweb.com/releases/2010/01/prweb3521374.htm. Jan. 27, 2010.
Wikipedia Article dated May 2, 2012, "Silly Bandz," printed and downloaded from Wikipedia on May 2, 2012.

* cited by examiner

*Primary Examiner* — Jack W. Lavinder
(74) *Attorney, Agent, or Firm* — Muir Patent Consulting, PLLC

(57) ABSTRACT

One or more ornaments for eyeglasses are disclosed. The ornaments include an attachment portion and an ornamentation portion. The attachment portion is configured so that it fits onto a temple of eyeglasses.

18 Claims, 8 Drawing Sheets

ORNAMENTS FOR EYEGLASSES

This application claims priority under 35 U.S.C. 119(e) to U.S. Provisional Patent Application No. 61/489,853, filed May 25, 2011, the contents of which are hereby incorporated by reference in their entirety.

BACKGROUND

Eyeglasses are generally worn for various purposes, such as to correct vision, to protect a person's eyes from the sun, or to protect a person's eyes from foreign objects. Eyeglasses come in various styles, shapes, and sizes, to fit a person's face, tastes, and visual or protective needs. Eyeglasses, especially for children, can be a source of embarrassment and afford others an opportunity for teasing. In addition, eyeglasses themselves often have a fairly non-descript appearance, and have similar styles. As such, it is not always easy for people to recognize their own eyeglasses among a group of similarly-styled eyeglasses.

SUMMARY

The present disclosure relates to ornaments for eyeglasses. The ornaments can be a vehicle for creativity and can be a fun fashion accessory. The ornaments can serve as markers to help distinguish different people's eyeglasses from each other. The use of one or more of the ornaments as disclosed herein can make wearing glasses 'cool,' and help avoid the teasing often associated with children who wear glasses.

BRIEF DESCRIPTION OF THE DRAWINGS

The above and other features and advantages will become more apparent to those of ordinary skill in the art by describing in detail various exemplary embodiments with reference to the attached drawings, in which.

DETAILED DESCRIPTION

Example embodiments will now be described more fully hereinafter with reference to the accompanying drawings. Exemplary embodiments may, however, be embodied in different forms and should not be construed as limited to the embodiments set forth herein.

In the drawings, the size and relative sizes of different objects may be exaggerated for clarity. Like numbers refer to like elements throughout.

It will be understood that when an element is referred to as being "adjacent to" another element, the elements may be touching, or spaced apart. In contrast, when an element is referred to as "contacting" another element, the elements are touching. When an element is referred to as "attached" to, "connected" to, "coupled" to, or "on" another element, it can be directly attached or connected or coupled to or on the other element or intervening elements may be present. In contrast, when an element is referred to as being "directly attached," "directly connected," or "directly coupled" to another element, there are no intervening elements present.

As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another as a naming convention. For example, a first ornament could be termed a second ornament, and, similarly, a second ornament could be termed a first ornament without departing from the teachings of the disclosure.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments described herein will be described referring to plan views and/or perspective views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Regions exemplified in figures have schematic properties, and shapes of regions shown in the figures exemplify specific shapes of regions of elements, and the specific properties and shapes do not limit aspects of the invention.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "parallel," "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1A:
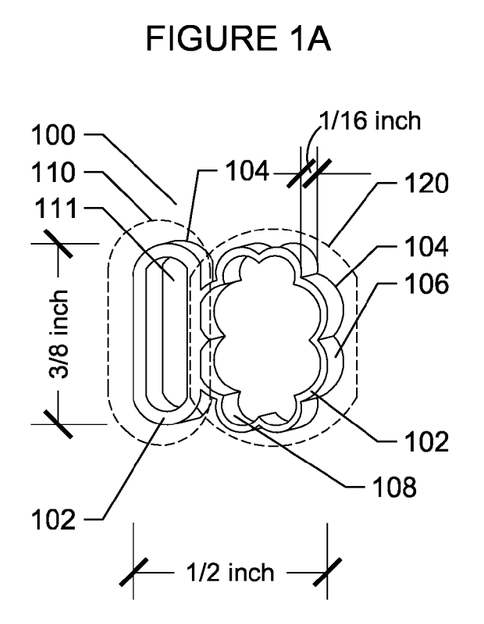
FIG. 1A is an exemplary illustration of an ornament for eyeglasses, consistent with certain disclosed embodiments.
Figure 1B:
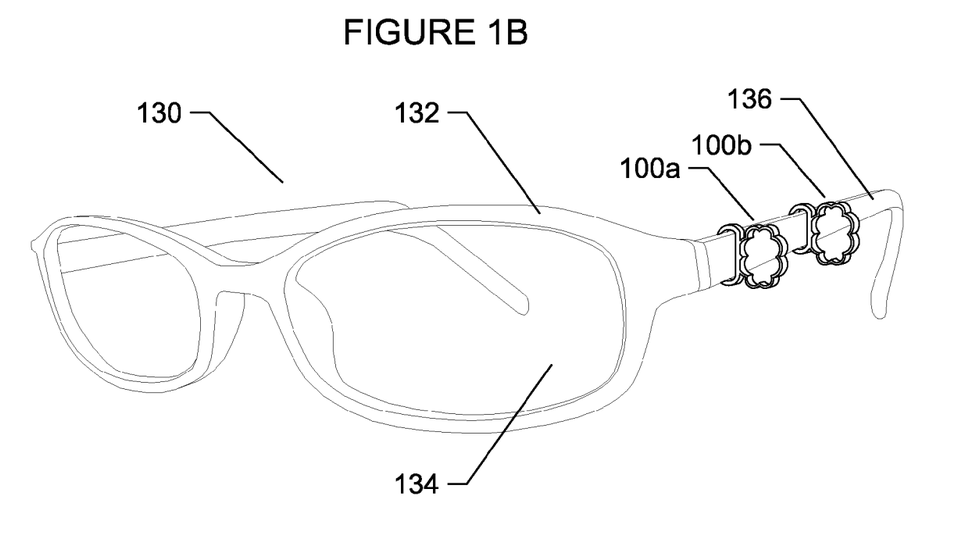
FIG. 1B is an exemplary illustration of two ornaments, such as depicted in FIG. 1A, attached to a temple of eyeglasses, consistent with certain disclosed embodiments.

FIG. 1A depicts an example of an ornament for eyeglasses, consistent with certain disclosed embodiments. FIG. 1B depicts an example of two ornaments, such as depicted in FIG. 1A, attached to a temple of eyeglasses (also described as an "arm" of eyeglasses), consistent with certain disclosed embodiments. The device referred to in FIG. 1A, and similar objects discussed herein, are referred to as ornaments. The devices may also be referred to herein as ornamental devices, or ornamental objects. In some instances, because these devices may serve as identifiers of eyeglasses, they may be referred to as identifier devices or identifier objects. The exemplary ornaments discussed herein have certain properties and may have various configurations.

In the example shown in FIG. 1A, and in certain other examples, an ornament 100 includes an attachment portion 110 and an ornamentation portion 120. The attachment portion 110 may also be referred to herein as a first portion, or an appendage. The ornamentation portion 120 may also be referred to herein as a second portion, a decorative portion, or a decoration.

As shown in FIG. 1A, the attachment portion 110 and the ornamentation portion 120 can be integrally formed to comprise a single component. For example, the attachment portion 110 and ornamentation portion 120 can be formed simultaneously by a single process, described in greater detail below, and may comprise one or more materials continuously formed throughout the ornament. In certain exemplary embodiments, the attachment portion 110 and ornamentation portion 120 form a single piece. As such, the attachment portion 110 and ornamentation portion 120 may be attached to each other based on the continuity of materials that form them. Accordingly, chemical or mechanical devices such as an adhesive, rivet, hinge, button, clasp, separate link, etc., need not be used. For example, the single piece may be formed so that it does not have separate independent parts moveable in relation to each other. In one example, the entire ornament is formed of a single, homogenous material. As such, the ornament 100 may be manufactured in a simple and efficient manner, as described further below. However, additional materials, or multiple layers of a same material or different materials may be used to form the ornament 100.

The one or more materials that form ornament 100 may include one or more layers, and may form a single piece that has certain physical properties. For example, the one or more materials may be bendable and stretchable, and may have a property that causes the ornament 100 to remain at a particular shape when no pressure or tension is exerted on it, to stretch when it is placed around an object (e.g., when an attachment portion of the ornament is placed around a temple of eyeglasses having a size larger than an opening in the attachment portion), and to revert back to the original shape after being bent or stretched. The one or more materials may be malleable enough and have sufficient elasticity to allow the attachment portion to stretch an appropriate amount to fit on temples of eyeglasses within a particular circumferential range. In one exemplary embodiment, one or more materials may be used that allow portions of an ornament to be stretched at least up to twice their original size (e.g., twice an original circumference in the case of a loop) without breaking and while still reverting to their original shape when the stretching force is no longer exerted. The elasticity of the material may cause the attachment portion to grasp a temple of eyeglasses by exerting force on the temple as the material attempts to return to its original shape. The one or more materials may have a tack, or coefficient of friction, that that allows the ornament 100 to remain in place on a temple of eyeglasses when it contacts the eyeglasses. In certain embodiments, the inherent physical properties of the one or more materials, such as tack, malleability, and/or elasticity, as well as the size of an opening in the attachment portion 110, cause the ornament 100 to fixedly attach to the eyeglasses when placed around and in contact with the temple.

Examples of material that can be used to form ornament 100 include silicone or nitrile, though other materials or combinations or materials can be used, such as different plastics, types of rubber, and/or resin, etc. In one example, a material such as silicone having a hardness and/or elasticity of approximately 60 durometers may be used. Other materials may be used, having hardness/elasticity in a range of, for example, 30-100 durometers. In certain embodiments, a hardness/elasticity is selected that allows the entire ornament 100, including the attachment portion 110 and ornamentation portion 120 to remain in a fixed, stable position when attached to eyeglasses.

As described above, the ornament 100 may be formed by one or more layers. Each layer may be planar and have flat surfaces. Alternatively, each layer can have undulating surfaces. The surfaces of each layer can have a uniform width throughout the layer. To form the attachment portion 110 and ornamentation portion 120, the one or more layers may include openings cut to form shapes when viewed from a direction perpendicular to the one or more layers.

An example of two ornaments 100a and 100b attached to a pair of eyeglasses 130 is shown in FIG. 1B. Eyeglasses 130 can be sunglasses, corrective glasses (i.e., for reading or distance, such as prescription eyeglasses), prescription sunglasses, or other eyewear that includes a rim 132, lenses 134, and temples 136 (also referred to herein as temple pieces). Different eyeglasses can have different sizes, and as discussed below, attachment portion 110 of ornament 100 can have different shapes and sizes to conform to different types and sizes of eyeglass temples 136.

Referring back to FIG. 1A, ornament 100 may be formed to include two major surfaces 102 and 104, and one or more additional surfaces extending between the major surfaces (e.g., 106, 108, etc.). The two major surfaces 102 and 104 may each be flat or planar surfaces, and may be opposite each other. For example, a first major surface 102 may be referred to as a front surface, and a second major surface 104 opposite the first surface 102 may be referred to as a back surface. The first major surface 102 and second major surface 104 may be parallel to each other. The major surfaces 102 and 104 may be equidistant from each other throughout the area of each surface. The major surfaces 102 and 104 may be planar surfaces. In certain example embodiments, attachment portion 110 and ornamentation portion 120 share the first major surface 102, and share the second major surface 104. As such, the first and second major surfaces 102 and 104 may be continuous surfaces that extend throughout the entire ornament 100. The major surfaces 102 and 104 may be smooth surfaces, or may be rough surfaces, depending on the material used. In some examples, the surfaces may be textured, to include, for example, ridges. However, even if ridges are present or other textures are included, the surfaces may still lie along a plane, and the planes formed by each major surface may be parallel to each other.

Exemplary ornaments can have different sizes to conform to different-sized eyeglasses and different personal tastes. For example, the attachment portion 110 of ornaments can have different sizes and shapes, discussed further below, to allow the ornament 100 to conform to different size ranges of eyeglass temples. Ornamentation portion 120 can have different sizes and shapes based on personal preferences or based on certain combinations of ornaments, discussed further below. An example of dimensions of an ornament 100 is shown in FIG. 1A. As shown, a thickness of the ornament 100 is 1/16 inch, a width of the ornament 100 is 1/2 inch, and a height of the ornament 100 is 3/8 inch. However, these are only exemplary dimensions, and other dimensions may be used as well. For example, to provide for easy stackability, described in greater detail below, a thickness of between 1/32 inch and 3/16 inch may be used. The width of the ornamentation portion 120 of the ornament 100 can range, for example, from between 1/4 inch to 1 inch, and the height can also range, for example, from 1/4 inch to 1 inch. Also, to provide an adequate sized opening for fitting on eyeglass temples, an opening can have a height between 1/8 inch and 1/2 inch, and a width, if not a slit such as shown as 221 in FIG. 2, between 1/32 inch and 1/4 inch, and material that forms the appendage that includes the opening has properties that allows it to be stretched at least up to two times its height and two times its width without breaking and while still reverting to its original shape after stretching.

FIG. 1A shows attachment portion 110 of ornament 100 having an oval-shaped opening 111. Such an opening may be used to securely affix the ornament 100 to a temple (or arm) 136 of eyeglasses 130. FIG. 1A also shows ornamentation portion 120 of ornament 100 having a flower, or cloud shape. However, as discussed in connection with the other figures below, attachment portion 110 and ornamentation portion 120 may have other shapes and configurations, in order to conform to different types of eyeglasses and to satisfy different personal tastes.

Figure 2:
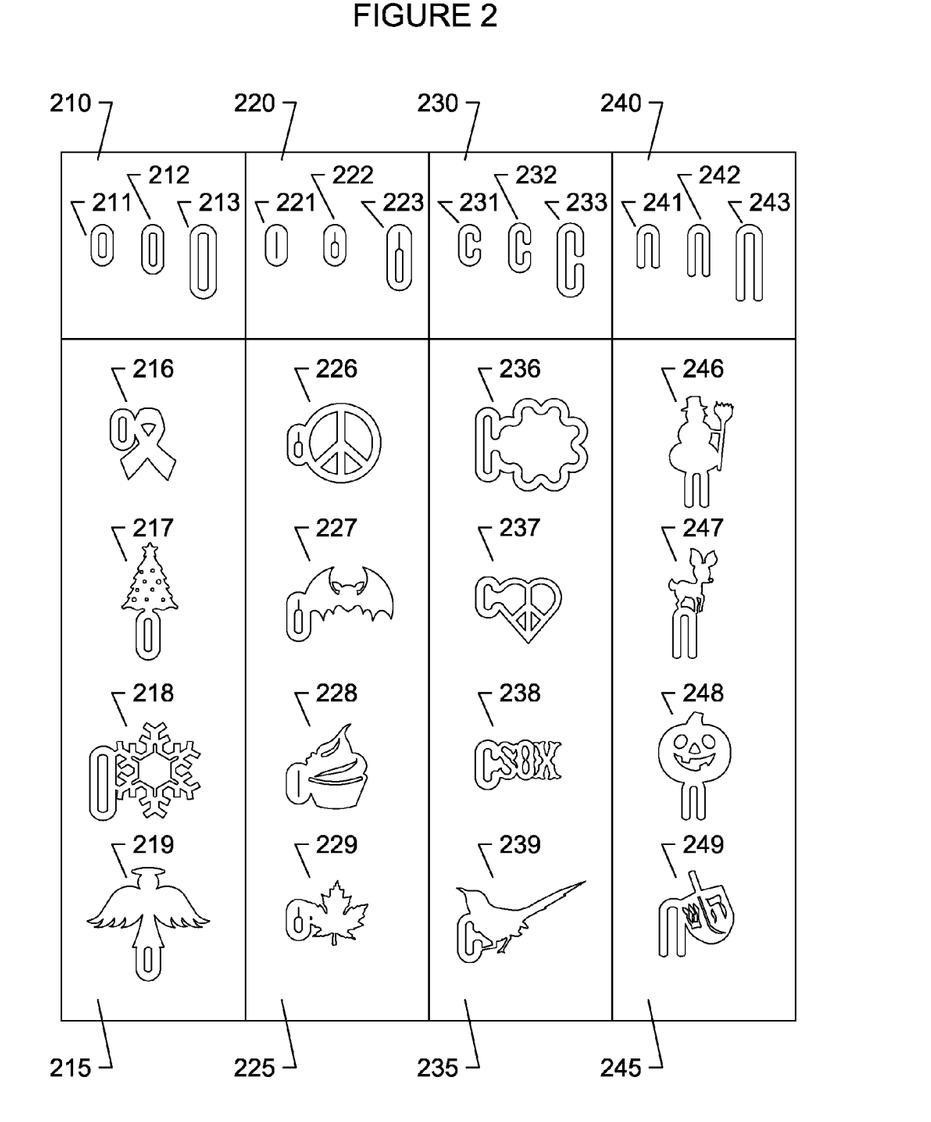
FIG. 2 is an exemplary illustration of different mechanisms for attaching an ornament to eyeglasses, and different exemplary decorations for the ornament, consistent with certain disclosed embodiments.

FIG. 2 depicts examples of different mechanisms for attaching an ornament to eyeglasses, and different exemplary decorations for the ornament, consistent with certain disclosed embodiments.

For example, the attachment portion of an ornament can include different types of openings. The openings can include, for example, an enclosed hole wherein material is absent in an inner region of the attachment portion, such as shown in box 210. The hole can have different sizes (as shown as 211, 212, and 213) to fit eyeglass temples having different heights and widths. The attachment portion can form a loop around the hole. Also, because the attachment portion can be made of a flexible, stretchable material, it can be made to fit a range of temples having a range of circumferences (e.g., between 1/4 inch and 1/2 inch; between 3/4 inch and 1 inch, etc.). The enclosed hole can be in an oval shape, or a circular shape or other shapes, and can be formed such that the attachment portion conforms to a temple of eyeglasses when placed around and in contact with the temple. In these embodiments, to place an ornament on eyeglasses, the end of an arm of the eyeglasses may be inserted through the opening of the attachment portion. The attachment portion can be slid along the length of the arm from the open end of the arm to a point along the arm where it is desired to be fixedly attached. The point may be a point where inner walls of the opening of the attachment portion provide sufficient friction against the arm (e.g., due to stretch, amount of contact, and/or tack) to fixedly attach to the arm.

Other openings can include a slit cut in the material, wherein no material is absent in the inner region of the attachment portion, such as shown in box 220, attachment portion 221. This type of opening can be used, for example, to fit very thin temples made, for example, of a thin metal. Different slits can have different lengths. As shown in attachment portions 222 and 223 of box 220, a combination of slit and enclosed hole can be used as well. The attachment portion can form a loop around these openings 221-223. In these embodiments, as discussed above with respect to box 210, to place an ornament on eyeglasses, the end of an arm of the eyeglasses may be inserted through the opening of the attachment portion, and the attachment portion can be slid along the length of the arm from the open end of the arm, until inner walls of the opening of the attachment portion provide sufficient friction against the arm (e.g., due to stretch, amount of contact, and/or tack) to fixedly attach to the arm.

Other types of openings can be formed, for example, a hole surrounded by an incomplete loop, wherein material is absent in an inner region of the attachment portion and also for part of the outside of the attachment portion. As such, the opening need not be fully enclosed by an outer part of the attachment portion. Such an attachment can form a clip-type attachment and can be made of stiffer material that clips into place. As shown in box 230, one type of clip can be a C-shaped clip, shaped such that the eyeglass temple can extend through an aperture in the ornamentation portion and can then snap into the slot through an opening in the loop. Examples of these are shown in box 230 as attachment portions 231, 232, and 233. Another type of clip can be a U-shaped clip that can snap into place directly onto a middle portion of the temple, without the need to slide the attachment portion (or ornamentation portion) along the length of the temple. Examples of these are shown in box 240 as attachment portions 241, 242, and 243. In certain embodiments, an incomplete loop that forms the attachment portion can include a majority portion of a complete loop.

The openings can be in an elongated, slot shape, as shown in the examples discussed above. However, the openings are not limited as such, and can also be circular, square, or another equilateral or non-elongated shape, in order to fit different eyeglasses having different shaped temples.

Numerous examples of attachment portions are shown in FIG. 2 that are integrated with the ornamentation portion and are coplanar with the ornamentation portion. Though not shown, other arrangements can be formed, without departing from the spirit and scope of the present disclosure.

As shown in FIG. 2, the ornamentation portion of the ornament can be molded into a number of different shapes. Certain shapes can be solid shapes with no openings, such as shown for ornaments 219, 227, 229, and 239, or can be shapes that include openings, such as shown for ornaments 216, 217, 218, 226, 228, 236, 237, 238, and 246-249. The ornamentation portion can be symmetrical (e.g., bilaterally or fully symmetrical) or asymmetrical, and can include decorations such as animals, famous characters, instruments, buildings, bridges, cars, furniture, articles of clothing, food, flowers, sporting equipment, street signs, peace signs, common shapes like circles, hearts, and the like. The ornamentation portion can include nature items, such as snowflakes, leaves, and the like. The ornamentation portion can also be shaped into alphanumeric characters, such as numbers or letters. Multiple letters can be used for spelling out words or one's initials. Alternatively, a single ornament can include whole words or alphanumeric strings. The ornamentation portion could be shaped to resemble logos or emblems, such as favorite athletic team logos for showing team spirit. The ornamentation portion can have different sizes, and can have different colors.

FIGS. 3A-3D depict of sets of ornaments for attaching to eyeglasses to form a pattern, consistent with certain disclosed embodiments, and exemplary ways in which they may be attached to temples of eyeglasses.

Figure 3A:
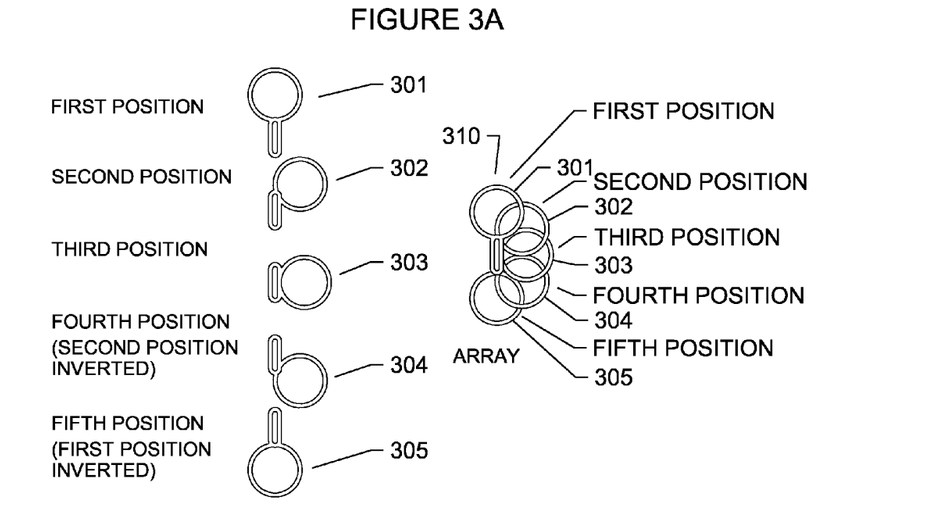
FIG. 3A is an exemplary illustration of a set of ornaments for attaching to eyeglasses to form a pattern, consistent with certain disclosed embodiments.

As shown, for example, in FIG. 3A, as well as in other figures, the attachment portion can be oriented in different positions in relation to a same ornamentation portion. For example, as shown in FIG. 3A, an ornamentation portion is in the shape of a circular ring, and an attachment portion is in the shape of an elongated oval, having an elongated slot as an opening. The elongated attachment portion can be oriented in different positions with respect to the ornamentation portion.

For example, ornament 301 shows an attachment portion oriented in a first position with respect to the ornamentation portion. The ornament 301 includes an elongated attachment portion having an elongated side and an end, wherein only the end contacts the ornamentation portion. As shown, the length L of the attachment portion is perpendicular to the circular ornamentation portion where the two portions connect.

Ornament 302 shows an attachment portion oriented in a second position with respect to the ornamentation portion. The ornament 302 includes an elongated attachment portion having an elongated side and an end, wherein part of the end and part of the elongated side contacts the ornamentation portion. As shown, the length L of the attachment portion is angled with respect to the circular ornamentation portion where the two portions connect.

Ornament 303 shows an attachment portion oriented in a third position with respect to the ornamentation portion. The ornament 303 includes an elongated attachment portion having an elongated side and an end, wherein only the elongated side contacts the ornamentation portion. As shown, the length L of the attachment portion is tangential to the circular ornamentation portion where the two portions connect.

Ornaments 304 and 305 show attachment portions oriented in fourth and fifth positions with respect to the ornamentation portion. Ornaments 304 and 305 are inverted versions of ornaments 302 and 301 respectively. In one embodiment, ornaments 304 and 305 may be the same as respective ornaments 302 and 301, but may be flipped before placing on a temple of eyeglasses in order to invert the ornaments. However, the set of ornaments 301-305 are exemplary only, and other arrangements of positioning of the attachment portions with respect to the ornamentation portions may be used.

As shown in FIG. 3A, a set of ornaments, such as ornaments 301-305 may be combined to form a pattern 310, or array. The set of ornaments can be provided as an ornament kit, having different components capable of being assembled to form ornament patterns. Although five ornaments are shown, an ornament set may include different amounts of ornaments including at least a first and second ornament, wherein the first ornament and the second ornament are arranged such that when the attachment portion of the first ornament and the attachment portion of the second ornament are aligned and stacked on each other such that a major surface of the first ornament faces a major surface of the second ornament, the ornamentation portion of the first ornament and the ornamentation portion of the second ornament form a fixed pattern different from individual patterns of either the ornamentation portion of the first ornament or the ornamentation portion of the second ornament. For example, when placed on the temple of eyeglasses, certain ornaments of an ornament set may extend outwardly, or at least partially outwardly, from the temple, such that a majority of the ornamentation portion is at an outside of the temple when viewed from the front of the eyeglasses when worn, as shown with ornaments 302, 303, and 304 of array 310. Other ornaments may extend above the temple, such as ornament 301, while other ornaments may extend below the temple, such as ornament 305.

Figure 3B:
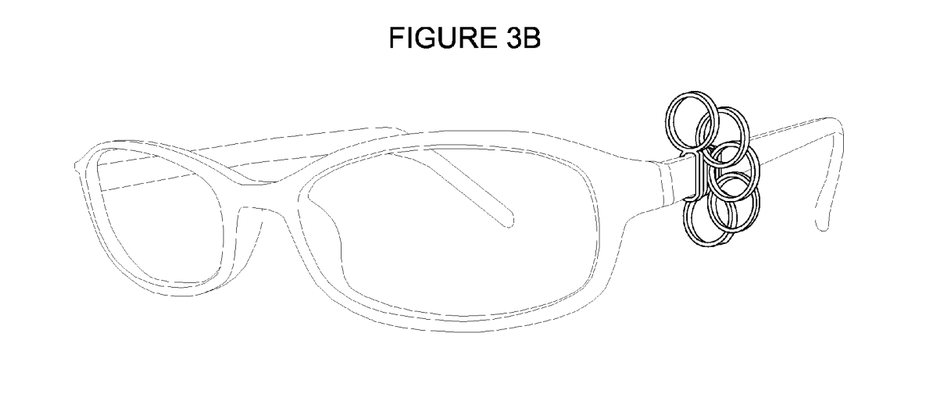
FIG. 3B is an exemplary illustration of a set of ornaments, such as depicted in FIG. 3A, attached to a temple of eyeglasses, consistent with certain disclosed embodiments.

FIG. 3B depicts an example of an ornament set such as shown in array 310 attached to eyeglasses. As shown in FIG. 3B, the ornaments of an ornament set can be stacked in a manner such that at least two adjacent ornaments contact each other, for example, via their major surfaces. In one embodiment, all of the ornaments placed on a single temple of eyeglasses are positioned such that each contacts all other adjacent ornaments. However, in other examples, such as shown in FIG. 3D, adjacent ornaments on a temple may be positioned with space between their major surfaces, such that they do not contact each other. Different arrangements can be made to form different patterns when viewed from different angles.

Figure 3C:
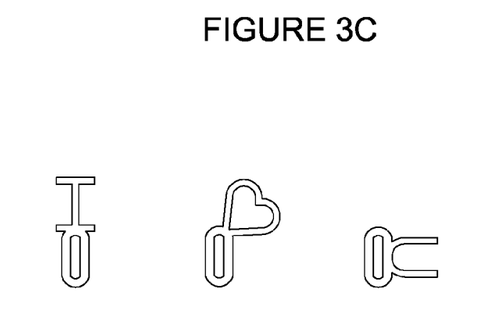
FIG. 3C is another exemplary illustration of a set of ornaments for attaching to eyeglasses to form a pattern, consistent with certain disclosed embodiments.
Figure 3D:
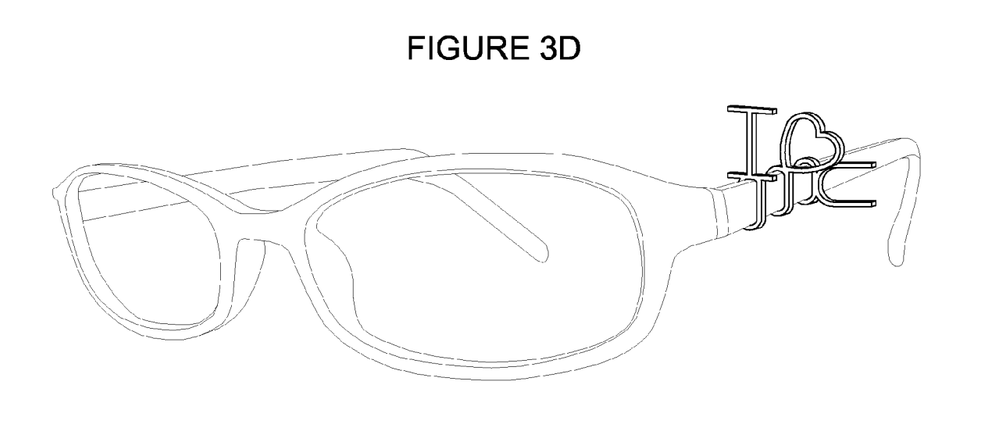
FIG. 3D is an exemplary illustration of a set of ornaments, such as depicted in FIG. 3C, attached to a temple of eyeglasses, consistent with certain disclosed embodiments.

As shown in FIGS. 3C and 3D, ornament sets can be used to create patterns, wherein the ornament sets include ornaments having different ornamentation portions. For example, different sets of letters and symbols can be used and oriented in different ways with respect to the attachment portion, so that when viewed from a position in front of the eyeglasses, the set of ornaments placed on a temple can spell a word or expression, such as shown in FIGS. 3C and 3D.

The ornament sets shown in FIGS. 3A-3D can include ornaments made of the same material, or ornaments made of different materials. In one example, as described further below, the ornaments are formed from a same manufacturing process. Although particular exemplary attachment portions and exemplary ornamentation portions are shown in FIGS. 3A-3D, other types of attachment portions or ornamentation portions, such as depicted in FIGS. 1, 2, and 4-6 may be used.

Figure 4A:
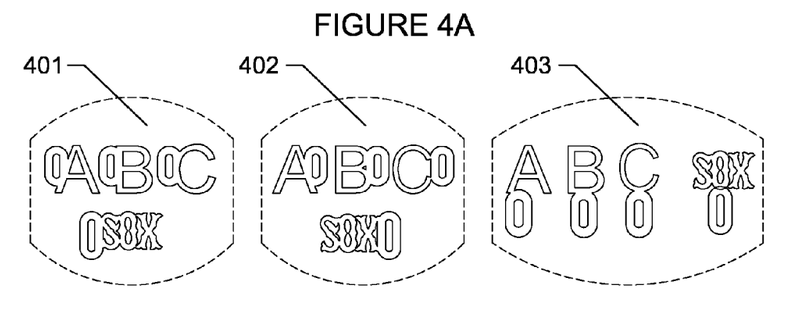
FIG. 4A is an exemplary illustration of different letters and logos that form decorations for an ornament, and different configurations for the attachment portion of the ornament, consistent with certain disclosed embodiments.
Figure 4B:
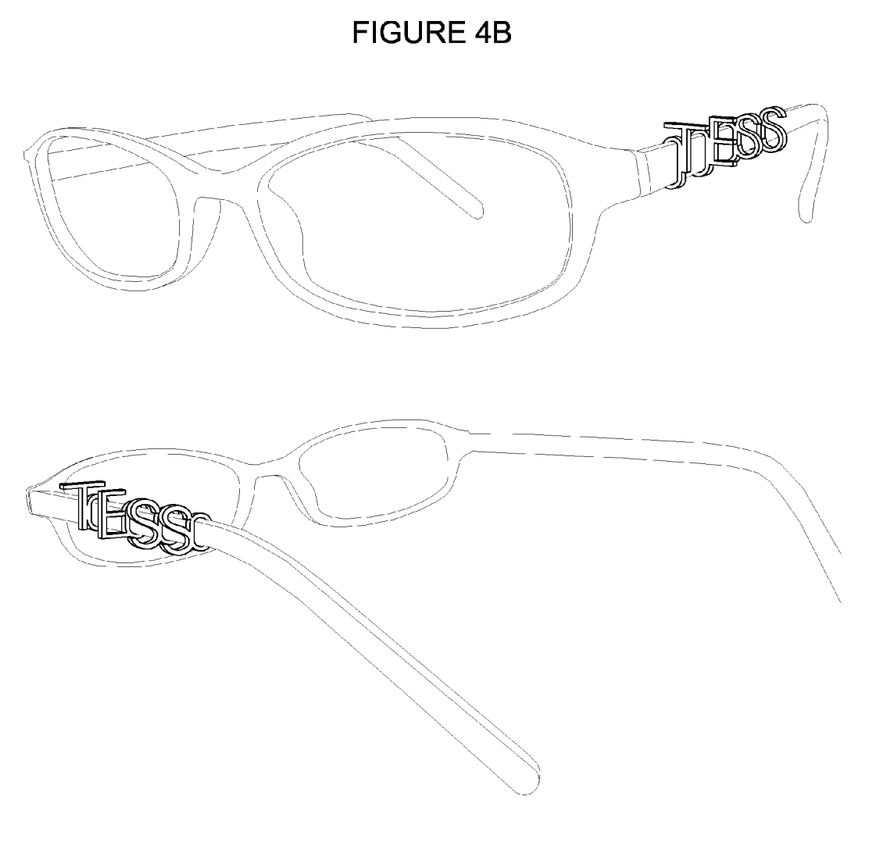
FIG. 4B is an exemplary illustration of a set of ornaments, such as letters, attached to temples of eyeglasses in different ways, consistent with certain disclosed embodiments.

FIGS. 4A and 4B depict additional orientations and positions of attachment portions with respect to ornamentation portions for additional exemplary ornaments. FIG. 4A is an example of different letters and logos that form decorations for an ornament, and different configurations for the attachment portion of the ornament, consistent with certain disclosed embodiments. FIG. 4B is an example of a set of ornaments, such as letters, attached to temples of eyeglasses in different ways, consistent with certain disclosed embodiments.

As shown in FIG. 4A, when letters are used as the ornamentation portion, or when words or logos are used, the attachment portion can be placed to the left or right of the letters, words, or logos, so that the letters, words, or logos can read the same way from left to right when placed on two different temples of a pair of eyeglasses. This different positioning of the ornamentation portion can be applied to any asymmetric ornamentation portion (e.g., bilaterally asymmetric ornamentation portion), to allow the asymmetric ornamentation portion to appear the same way to a person viewing the ornament from the front of the eyeglasses. Therefore, as shown in FIG. 4A, ornament set 401 includes letters A, B, and C, and a logo SOX wherein the ornamentation portion is connected to an attachment portion on the left, and ornament set 402 includes letters A, B, and C, and a logs SOX wherein the ornamentation portion is connected to an attachment portion on the right. The attachment portion can also be placed above or below the ornamentation portion, as shown in ornament set 403.

As shown in FIG. 4B, when sets of ornaments are used that have attachments at different locations, such as to the left or right of the ornamentation portion, the ornaments can be placed on the temple of eyeglasses in different ways so that words or logos can be read in the proper direction (e.g., left to right) from the front of the eyeglasses, from the back of the eyeglasses, or the same way from a single direction when placed on opposite (e.g., left and right) temples of a pair of eyeglasses. Although particular exemplary attachment portions and exemplary ornamentation portions are shown in FIGS. 4A and 4B, other types of attachment portions or ornamentation portions, such as depicted in FIGS. 1-3, 5, and 6 may be used.

Figure 5A:
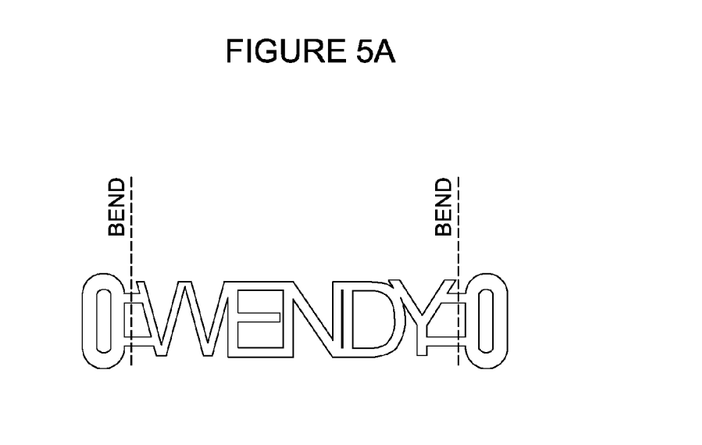
FIG. 5A is an exemplary illustration of an ornament that has two attachment portions for attaching to a temple of eyeglasses, consistent with certain disclosed embodiments.
Figure 5B:
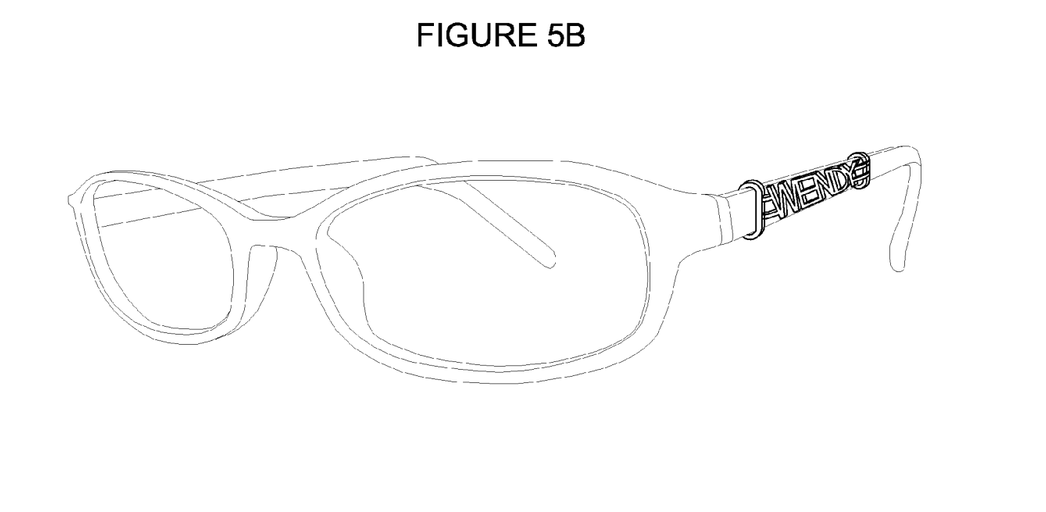
FIG. 5B is an exemplary illustration of an ornament such as depicted in FIG. 5A, attached to a temple of eyeglasses, consistent with certain disclosed embodiments.

FIG. 5A depicts an example of an ornament that has two attachment portions for attaching to a temple of eyeglasses, consistent with certain disclosed embodiments. FIG. 5B depicts an example of an ornament such as depicted in FIG. 5A, attached to a temple of eyeglasses, consistent with certain disclosed embodiments. As shown in these figures, in certain exemplary embodiments, an ornament may have two attachment portions, for example, to the left and right of an ornamentation portion. The ornament shown in FIG. 5A may be made of a malleable, stretchable material, such as silicone, such that both attachment portions can be positioned around a temple of eyeglasses, causing the ornamentation portion to run along the length of the temple, as shown in FIG. 5B. Although particular exemplary attachment portions and an exemplary ornamentation portion is shown in FIGS. 5A and 5B, other types of attachment portions or ornamentation portions, such as depicted in FIGS. 1-4 and 6 may be used.

Figure 6:
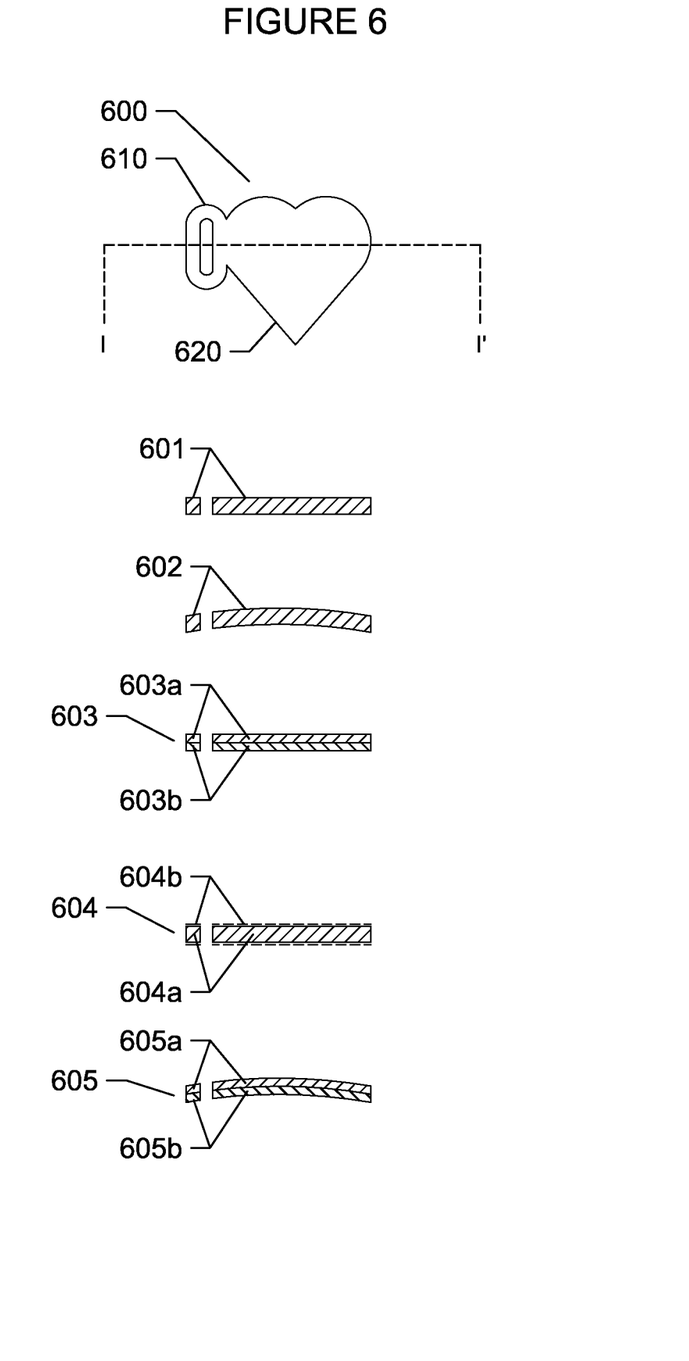
FIG. 6 is an exemplary illustration of different cross-sectional views showing different exemplary configurations for an ornament, according to certain disclosed embodiments.

FIG. 6 depicts different cross-sectional views showing different exemplary configurations for an ornament, according to certain disclosed embodiments. An exemplary frontal view of an ornament 600 shows an attachment portion 610 and an ornamentation portion 620. Exemplary cross-sectional views of different compositions of ornament 600 taken along line I-I' of FIG. 6 are also shown. The ornamentation portion 620 may form a symbol, letter, word, logo, or other object. The attachment portion 610 may be an appendage to the ornamentation portion 620. For example, the ornament portion may be a decoration having a particular recognizable shape (e.g., a letter, word, or symbol), and the appendage can be integrally formed with the decoration, but not be part of the particular shape.

In one embodiment, the attachment portion 610 and ornamentation portion 620 are integrally formed in an area-wise direction to form a sheet of material. The sheet may consist of a single layer of a single material, as shown, for example, for ornament compositions 601 and 602, or may include multiple layers of the same or different materials, as shown, for example, for ornament compositions 603 (layers 603a and 603b), 604 (layers 604a and 604b), and 605 (layers 605a and 605b). The sheet may also include one or more core layers (the layers shown for ornament compositions 601, 602, 603, and 605 may be considered core layers, and one core layer 604a is depicted, for example, for ornament composition 604), and one or more additional layers 604b, such as a decorative layer (e.g., a paint or other coloration layer, a textured layer, a layer including reflective or refractive particles, etc.). Each layer, such as core layers shown in ornament compositions 601, 602, 603, 604 and 605, may be comprised of a single material, that may be a homogenous material, such that an entire ornament, or a layer of an ornament may be an integral structure that includes an attachment portion integrally formed with an ornamentation portion. For example, in one embodiment, silicone is used to form a single layer that comprises an entire ornament, wherein the silicone integrally forms both an attachment portion and an ornamentation portion.

As shown in the example embodiments of FIG. 6, a sheet that forms the ornament 600 can be a flat sheet that remains in a flat state when no pressure or tension is exerted on it, such as shown for ornament compositions 601, 603, and 604. Alternatively, the sheet can be a curved sheet that remains in a curved, or bent state when no pressure or tension is exerted on it, such as shown for ornament compositions 602 and 605. In either case, front and back surfaces (which appear as the top and bottom surfaces for the cross-sectional views of ornament compositions 601-605) can be spaced the same distance apart from each other throughout the area of the surfaces.

Though not shown in the figures, each ornament can have one or more colors. The colors can be part of the inherent structure of the material that makes up the core layers of an ornament, and/or may be selected based on decorative layers, such as colored paint or other spray-on type materials. If a plurality of layers are used for an ornament, each layer can have a different color. Alternatively, or additionally, a single layer can have a plurality of colors.

Figure 7:
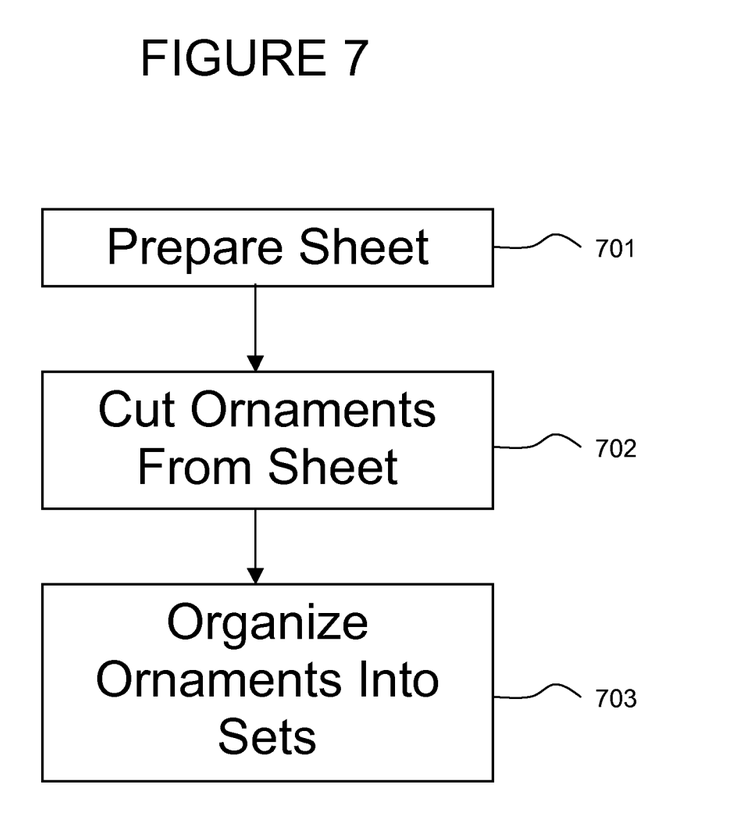
FIG. 7 is a block diagram illustrating an example of a method of manufacturing a plurality of ornaments, consistent with certain disclosed embodiments.

FIG. 7 depicts an exemplary method of manufacturing a plurality of ornaments, consistent with certain disclosed embodiments. However, FIG. 7 is only one example, and other methods of manufacturing may be used.

As shown in FIG. 7, in step 701, a sheet may be prepared. The sheet may include a single layer of material, or a plurality of layers of material. Each layer may include a single material, such as, for example, silicone, nitrile, or another flexible, malleable material. The material may be a homogeneous material such that its density and chemical makeup is substantially evenly distributed throughout. The homogeneous material may be composed of a single element or compound, or multiple elements or compounds.

In step 702, ornaments are cut from the sheet, using, for example cutting tools in the shape of the ornament. In one example, the same ornament can be cut repeatedly from a single sheet. In another example, different ornaments can be cut from a single sheet. As a result of the cutting, a plurality of ornaments, each having an integrally formed attachment portion and ornamentation portion, are formed.

In step 703, after a plurality of ornaments are cut, the ornaments can be organized into sets. For example, a set may include certain selected letters, or all letters of the alphabet, or a group of objects, or any other combination of ornaments.

Although a method of manufacturing ornaments by cutting them from a sheet is described in FIG. 7, other method of manufacturing sets of ornaments may be used. For example, one or more molds may be used, such that a liquid material is poured into the molds and then hardens to form the different ornaments. A first mold may include, for example, a set of shapes that form same or different shaped ornaments. In another example, an extrusion method may be used to extrude material through a die having a shape of the ornament, and then the material having the shape of the ornament can be cut into slices to form a plurality of ornaments.

The ornaments disclosed herein can allow people of any age to personalize their eyeglasses with a variety of shapes, such as letters that can spell out words (e.g. a name) or a logo of their favorite team. The ornaments can be a means of self expression, a way to convey something about oneself to others, to communicate non-verbally through the chosen design, to voice political views, or to express unique sensibility through one's personal 'flag' that can change on a whim.

The ornaments disclosed herein can also serve as a method of coding. The individual wearer, having affixed one or more ornaments to personal property in a uniquely created combination of shapes, letters, colors, patterns, spacing, and location on the temple (in the case of eyeglasses), is afforded a fast method of identifying personalized property. Affixing one or more ornaments to one's personal property can serve as a way to identify to a finder unique identifying details when a design is otherwise unremarkable, such as in the case of many eyeglasses.

As discussed above, the attachment portion can be formed by a slot, which allows the ornament to slide or clip onto the temple and stay securely fixed in place. The material of the ornament can be arranged to be malleable enough to allow the slot to stretch as needed by the sizing or location of the temple thereby allowing the ornamental device to fit most pairs of eyeglasses. The tack of the material can be arranged to provide sufficient friction for each ornament to remain in a fixed position until it is relocated or replaced. The slots can be made in several sizes to accommodate the greatest number of frame types.

The ornaments described herein are designed to be readily slid or snapped on and off so they can be interchanged at any given time and/or traded with friends. A plurality of ornaments can be stacked on each other to form different patterns or spell different names or words. In some embodiments, the ornaments are planar and may be formed from a sheet, and the attachment of the ornaments to the eyeglasses is through an opening in the plane or sheet. As a result, the ornamentation portion of the ornament can be exhibited facing the front of a person wearing eyeglasses, parallel to a plane of the face and perpendicular to the temple of the eyeglasses.

While the ornaments of the present teachings are described as being sized and shaped for use with eyeglasses, they could be used as attachable ornamental accessories for various other devices, such as hair headbands, barrettes, other headgear, bracelets, rings, or other thin hard materials that can be worn by a person.

It is to be understood that the foregoing is illustrative of various example embodiments and is not to be construed as limited to the specific examples disclosed, and that modifications to the disclosed examples, as well as other embodiments, are intended to be included within the scope of the appended claims.

What is claimed is:

1. An ornament for eyeglasses, the ornament comprising:
an attachment portion configured to fixedly attach to a temple of eyeglasses;
an ornamentation portion attached to the attachment portion;
a first major surface;
a second major surface opposite the first major surface;
one or more additional surfaces extending from the first major surface to the second major surface;
wherein the attachment portion and the ornamentation portion share the first major surface, and the attachment portion and the ornamentation portion share the second major surface, and
wherein the attachment portion and ornamentation portion are integrally formed by a first layer,
wherein the attachment portion is formed of an elastic material and has a closed loop configuration.

2. The ornament of claim 1, wherein:
the attachment portion includes a slot.

3. The ornament of claim 2, wherein:
the slot has a height between ⅛ and ½ inch.

4. The ornament of claim 1, wherein:
the first layer consists of a first material that is an elastic, bendable material.

5. The ornament of claim 1, wherein:
the first layer consists of a first material homogeneously formed throughout the first layer.

6. The ornament of claim 1, wherein:
the first layer consists of a first material, and the ornament consists of only the first layer.

7. The ornament of claim 1, wherein:
the ornamentation portion includes one or more alphanumeric characters that form an asymmetric object when viewed from left to right; and
the attachment portion is disposed either to the left or to the right of the one or more alphanumeric characters.

8. The ornament of claim 1, wherein the ornamentation portion includes one or more letters, numbers, words, or names, or a combination thereof, and wherein the attachment portion comprises a first attachment portion, and further comprising:
a second attachment portion configured to fixedly attach to a temple of eyeglasses, wherein the ornamentation portion is disposed between the first attachment portion and the second attachment portion, such that the ornamentation portion is configured to run along the length of the temple when both the first attachment portion and the second attachment portion are fixedly attached to the temple.

9. The ornament of claim 1, wherein:
the first major surface is a front surface that faces toward a front of eyeglasses when the ornament is fixedly attached to the temple of eyeglasses worn by a person; and
the second major surface is a back surface opposite the front surface.

10. The ornament of claim 1, wherein:
the first major surface is a flat, planar surface; and
the second major surface is a flat, planar surface parallel to the first major surface.

11. The ornament of claim 1, wherein:
the ornament is part of an ornament set, the ornament set comprising:
a second ornament having a different shape from the first ornament and including:

an attachment portion configured to fixedly attach to a temple of eyeglasses;
an ornamentation portion attached to the attachment portion;
a first major surface;
a second major surface opposite the first major surface;
one or more additional surfaces extending from the first major surface to the second major surface,
wherein the attachment portion and the ornamentation portion share the first major surface, and the attachment portion and the ornamentation portion share the second major surface, and
wherein the attachment portion and ornamentation portion share a first layer, wherein the first layer is integrally formed through the attachment portion and the ornamentation portion;
wherein the first layer of the first ornament is composed of a first material, and the first layer of the second ornament is composed of the first material.

12. The ornament of claim 11, wherein:
the first ornament is an ornament provided from a first sheet of the first material; and
the second ornament is an ornament provided from the first sheet of the first material.

13. The ornament of claim 11, wherein:
the first ornament is an ornament provided from a first mold filled with the first material; and
the second ornament is an ornament provided from the first mold filled with the first material.

14. The ornament of claim 11, wherein:
the first ornament and the second ornament are arranged such that when the attachment portion of the first ornament and the attachment portion of the second ornament are aligned and stacked on each other such that a major surface of the first ornament faces a major surface of the second ornament, the ornamentation portion of the first ornament and the ornamentation portion of the second ornament form a fixed pattern different from individual patterns of either the ornamentation portion of the first ornament or the ornamentation portion of the second ornament.

15. An ornament kit for eyeglasses, the ornament kit comprising:
at least a first integrally formed piece, the first integrally formed piece including:
a first attachment portion having an opening and configured to attach in a fixed manner to a temple of eyeglasses, wherein the first attachment portion is formed of an elastic material; and
a first ornamentation portion attached to the first attachment portion and configured to extend at least partially outwardly from the temple when the first attachment portion is affixed to the temple and as viewed from the front of the eyeglasses when worn; and
at least a second integrally formed piece, the second integrally formed piece separate from the first integrally formed piece and including:
a second attachment portion having an opening, and configured to attach in a fixed manner to a temple of eyeglasses, wherein the second attachment portion is formed of an elastic material; and
a second ornamentation portion different from the first ornamentation portion, the second ornamentation portion attached to the second attachment portion and configured to extend at least partially above or below the temple when the second attachment portion is affixed to the temple and as viewed from the front of the eyeglasses when worn.

16. The ornament set of claim 15, wherein the opening of the first attachment portion has an elongated shape, and the opening of the second attachment portion has the same elongated shape as the shape of the opening of the first attachment portion.

17. The ornament set of claim 15, wherein:
the first integrally formed piece includes:
a first surface shared by the first attachment portion and the first ornamentation portion, and
a second surface opposite the first surface, the second surface shared by the first attachment portion and the first ornamentation portion; and
the second integrally formed piece includes:
a first surface shared by the second attachment portion and the second ornamentation portion, and
a second surface opposite the first surface, the second surface shared by the second attachment portion and the second ornamentation portion.

18. An ornament for the eyeglasses, the ornament comprising:
an ornamentation portion having a recognizable shape; and
an appendage to the ornamentation portion, the appendage comprising a shape, material, and flexibility configured to fit onto and affix securely to a temple of eyeglasses, wherein:
the ornamentation portion is configured to extend outwardly from the temple when the appendage is affixed to the temple,
the attachment portion and ornamentation portion are formed of a single piece,
the single piece includes one or more materials forming one or more respective layers, a least a first of the one or more layers extending along a single plane and forming an integral structure that includes both the ornamentation portion and the appendage,
the appendage includes a slot having a height between ⅛ inch and ½ inch, and a width between 1/32 inch and ¼ inch; and
the material that forms the appendage that includes the slot has properties that allows it to be stretched, when a stretching force is applied, to at least up to two times its height and two times it width without breaking, and to revert to its original shape when the stretching force is no longer applied.

* * * * *